(12) United States Patent
Suetsugu et al.

(10) Patent No.: US 8,594,906 B2
(45) Date of Patent: Nov. 26, 2013

(54) DIAGNOSIS FOR MULTIPLE CYLINDER ENGINE

(75) Inventors: Hajime Suetsugu, Higashihiroshima (JP); Kenji Kojima, Hiroshima (JP); Tetsushi Hosokai, Kure (JP); John D. Russell, Portland, OR (US)

(73) Assignees: Mazda Motor Corporation, Hiroshima (JP); Ford Global Technologies, LLC, Dearborn, MI (US)

( * ) Notice: Subject to any disclaimer, the term of this patent is extended or adjusted under 35 U.S.C. 154(b) by 838 days.

(21) Appl. No.: 12/732,497

(22) Filed: Mar. 26, 2010

(65) Prior Publication Data

US 2011/0238279 A1    Sep. 29, 2011

(51) Int. Cl.
| | | |
|---|---|---|
| *B60T 7/12* | (2006.01) | |
| *G05D 1/00* | (2006.01) | |
| *G06F 7/00* | (2006.01) | |
| *G06F 17/00* | (2006.01) | |
| *F02D 41/00* | (2006.01) | |
| *G01N 7/00* | (2006.01) | |
| *G01N 33/497* | (2006.01) | |

(52) U.S. Cl.
USPC ........... 701/103; 123/692; 123/704; 73/23.32

(58) Field of Classification Search
USPC .......... 123/690, 692, 672, 479, 704; 701/102, 701/103; 73/23.32; 60/277
See application file for complete search history.

(56) References Cited

U.S. PATENT DOCUMENTS

| | | | | |
|---|---|---|---|---|
| 5,964,208 A | * | 10/1999 | Yamashita et al. | 123/674 |
| 6,032,659 A | * | 3/2000 | Yamashita et al. | 123/674 |
| 6,898,927 B2 | * | 5/2005 | Morinaga et al. | 60/284 |
| 7,040,085 B2 | * | 5/2006 | Namiki | 60/277 |
| 7,483,781 B2 | | 1/2009 | Wakahara et al. | |
| 7,802,563 B2 | * | 9/2010 | Behr et al. | 123/692 |
| 2009/0241925 A1 | | 10/2009 | Behr et al. | |

\* cited by examiner

*Primary Examiner* — Stephen K Cronin
*Assistant Examiner* — Sherman Manley
(74) *Attorney, Agent, or Firm* — Alleman Hall McCoy Russell & Tuttle LLP

(57) ABSTRACT

Methods and systems for diagnosing a multiple cylinder engine are provided herein. An exemplary method of diagnosing an internal combustion engine system having a multi-cylinder internal combustion engine is described. In one example, cylinder air-fuel imbalance is determined from the squared value of a difference of two values.

14 Claims, 8 Drawing Sheets

DIAGNOSIS FOR MULTIPLE CYLINDER ENGINE

BACKGROUND

The present description relates to diagnosis for a multiple cylinder engine, more particularly to a method and system to detect imbalance of air fuel ratio between the cylinders of a multiple cylinder engine.

It may be desirable to have equivalent air-fuel mixtures in engine cylinders so that engine emissions can be controlled. For example, when similar air-fuel mixtures are combusted in each engine cylinder, the cylinder air-fuel mixtures may be adjusted to improve efficiency of a catalyst in the exhaust system with a reduced possibility of producing a misfire. In particular, when all engine cylinders are combusting substantially equivalent air-fuel mixtures, the engine air-fuel mixture may be leaned to improve catalyst efficiency with less possibility of a single cylinder misfiring due to that one cylinder reaching a lean combustion limit before other cylinders. On the other hand, if one engine cylinder is operating at a leaner air-fuel mixture than other cylinders, then the possibility of one cylinder misfiring during leaning of engine air-fuel ratio may increase. It is therefore desirable to provide a method for improving the detection of cylinder air-fuel imbalance.

SUMMARY

The inventors herein have rigorously studied to improve the accuracy of the air fuel ratio cylinder imbalance diagnosis and unexpectedly found a method to diagnosis the air fuel ratio cylinder imbalance using a single air fuel ratio sensor with a certain range of tolerance of its output signal characteristic which is described in the present description.

Accordingly, there is provided, in one aspect of the present description, a method of diagnosing an internal combustion engine system having a multi-cylinder internal combustion engine and an air fuel ratio sensor which detects an air fuel ratio of mixed exhaust gas flowing from the multiple cylinders and outputs a signal corresponding to said detected air fuel ratio. The method comprises computing a square value of a difference between two values, said air fuel ratio sensor outputting said two values at discrete timings within a predetermined period, integrating said square value over predetermined times to form an integrated square value, and diagnosing said internal combustion engine system based on said integrated square value.

According to the first aspect, by diagnosing the internal combustion engine system based on the integrated square value of the difference between two values of the air fuel ratio sensor outputs within a predetermined period, the imbalance of air fuel ratios between cylinders can be distinguished even under the condition where the output signal of the air fuel ratio sensor varies due to its output signal characteristics.

Specifically, a change of the sensor output signal caused by the failed cylinder is greater than the output signal variation caused by a sensor characteristic in parts of a cylinder cycle. In the other parts of the cylinder cycle, the sensor output signal still changes due to the sensor characteristic, but that change is smaller than the change caused by a degraded cylinder. By integrating the square value of a change of the sensor output signal, this change caused by the failed cylinder is made even greater to overwhelm the change caused by the sensor characteristic.

Further, in a second aspect of the present description, there is provided a method of diagnosing an internal combustion engine system having a multi-cylinder internal combustion engine and an air fuel ratio sensor which detects an air fuel ratio of mixed exhaust gas flowing from the multiple cylinders and outputs a signal corresponding to said detected air fuel ratio. The method comprises computing a square value of a difference between two values, said air fuel ratio sensor outputting said two values at a predetermined interval, integrating said square value over predetermined times, and diagnosing said internal combustion engine system based on said integrated square value.

According to the second aspect, the method also includes diagnosing the internal combustion engine system based on the integrated square value of a difference between two values the air fuel ratio sensor outputs, in this case, at the predetermined interval, as in the first aspect. The imbalance of air fuel ratios between cylinders can be distinguished even under the condition where the output signal of the air fuel ratio sensor varies due to its output signal characteristics.

Further, in a third aspect of the present description, there is provided a method of diagnosing an internal combustion engine system having a multi-cylinder internal combustion engine and an air fuel ratio sensor which detects an air fuel ratio of mixed exhaust gas flowing from the multiple cylinders and outputs a signal corresponding to said detected air fuel ratio. The method comprises computing a square value of a difference between maximum and minimum values that the air fuel ratio sensor outputs at least during a cylinder cycle, and diagnosing said internal combustion engine system based on said square value.

According to the third aspect, the method also includes diagnosing the internal combustion engine system based on the integrated square value of a difference between two values the air fuel ratio sensor outputs, in this case, maximum and minimum values said air fuel ratio sensor outputs during at least a cylinder cycle. The imbalance of air fuel ratios between cylinders can be distinguished even under the condition where the output signal of the air fuel ratio sensor varies due to its output signal characteristics.

DETAILED DESCRIPTION

Hereafter, a diagnosing method and a diagnostic system of an engine system are described more specifically referring to the appended drawings. Note that the following description of an embodiment is one example an illustration, and various alternative embodiments may also be used.

Figure 1:
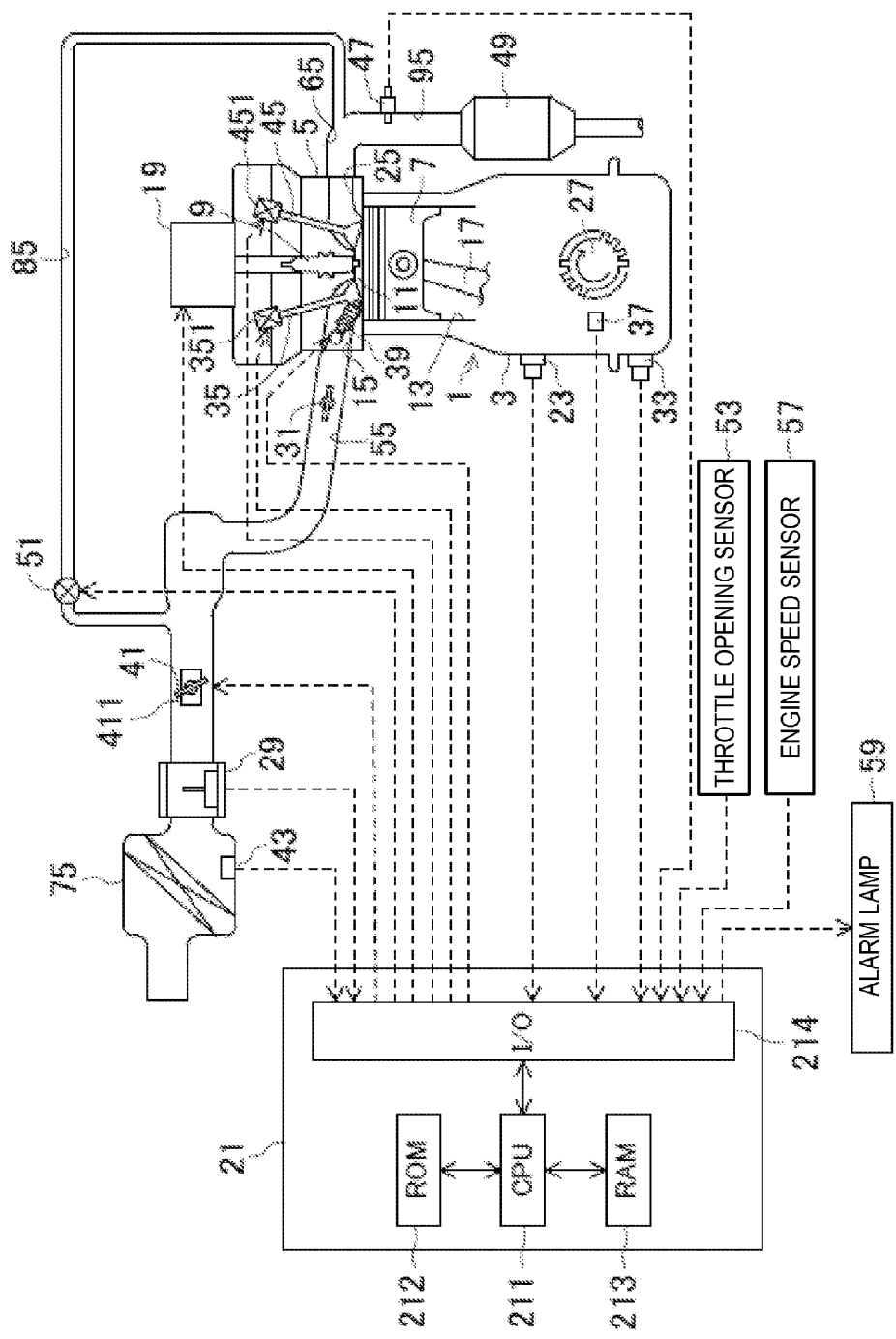
FIG. 1 is a schematic view showing an example of the engine system by which the exemplary diagnostic system is applied.

FIG. 1 is a schematic view of the engine system. Although the engine 1 with which the system is provided is illustrated only with a single cylinder in the drawing, it is in fact an in-line four-cylinder, spark-ignition direct-injection engine in this embodiment. However, the engine 1 is not limited to this type. For example, the number of cylinders may differ from this. Further, the engine may be a V-type engine and a horizontally-opposed engine. Fuel may not be injected into combustion chambers but may be injected into intake ports.

The engine 1 is provided with a cylinder block 3 and a cylinder head 5 fixed to an upper part of the cylinder block 3. Reciprocatable pistons 7 are fitted in respective cylinders 13 of the cylinder block 3, and each combustion chamber 11 surrounded by a top face of the piston 7, an inner wall surface of the cylinder 13, and a pentroof-shaped bottom face of the cylinder head 5 is formed above the piston 7. A crankshaft (not shown) is arranged inside a crank case below the pistons 7, and a connecting rod 17 connects the crankshaft with the pistons 7.

In the crank case, a crank angle sensor 37 for detecting a rotation angle (crank angle) of the crankshaft is arranged. The crank angle sensor 37 has an electromagnetic pickup coil for outputting a signal to a PCM (Power-train Control Module) 21. When a rotor 27 which is attached to an end part of the crankshaft so that it integrally rotates when the crankshaft rotates, the crank angle sensor 37 outputs the signals corresponding to passage of convex parts provided on the peripheral part of the rotor 27.

An engine water temperature sensor 23 for detecting a temperature of cooling water which flows through the inside of a water jacket (not shown), and an engine oil temperature sensor 33 for detecting a temperature of engine oil, are attached to the cylinder block 3.

A plurality of spark plugs 9 are attached to the cylinder head 5 so that they correspond to the respective cylinders 13. Tip electrodes of each spark plug 9 face to the inside of each combustion chamber 11, and each spark plug 9 is connected with an ignition circuit 19 arranged in an upper part of the cylinder head 5. Although the provided number of the ignition circuits 19 only correspond to the number of the spark plugs 9 in this example, one or more ignition circuits which are common to a plurality of spark plugs 9 may be provided. An injector 39 for directly injecting fuel into each combustion chamber 11 is attached to the cylinder head 5. The injector 39 is connected with a fuel feed source located outside the drawing via a feed pipe to be supplied with fuel from the fuel feed source. Two pairs of intake ports 15 and exhaust ports 25 which communicate with each combustion chamber 11 are formed also in the cylinder head 5 (in the illustrated example, only one pair of these are shown). Intake and exhaust valves (intake valves 35 and exhaust valves 45) that open and close independently at predetermined timings are arranged in port opening parts of the intake ports 15 and the exhaust ports 25 through VVT (Variable Valve Timing) mechanisms 351 and 451, respectively. The VVT mechanisms 351 and 451 are mechanisms for changing opening and closing timings of the intake valves 35 and the exhaust valves 45 toward advance side or retard side, and can change a quantity of combusted gas which remains in each combustion chamber 11 by changing an overlap period of opening and closing of the intake valves 35 and the exhaust valves 45. There is no restriction in particular about the configuration of the VVT mechanisms, and mechanical-type VVTs or electromagnetic-type VVTs may also be adopted.

An intake passage 55 communicates with the intake ports 15 of each cylinder 13, and an exhaust passage 65 communicates with the exhaust ports 25. An EGR passage 85 mutually connects the intake passage 55 and the exhaust passage 65. By adjusting opening of an EGR valve 51 arranged at an intermediate position of the EGR passage 85, a part of exhaust gas in the exhaust passage 65 flows back to the intake passage 55.

Figure 2:
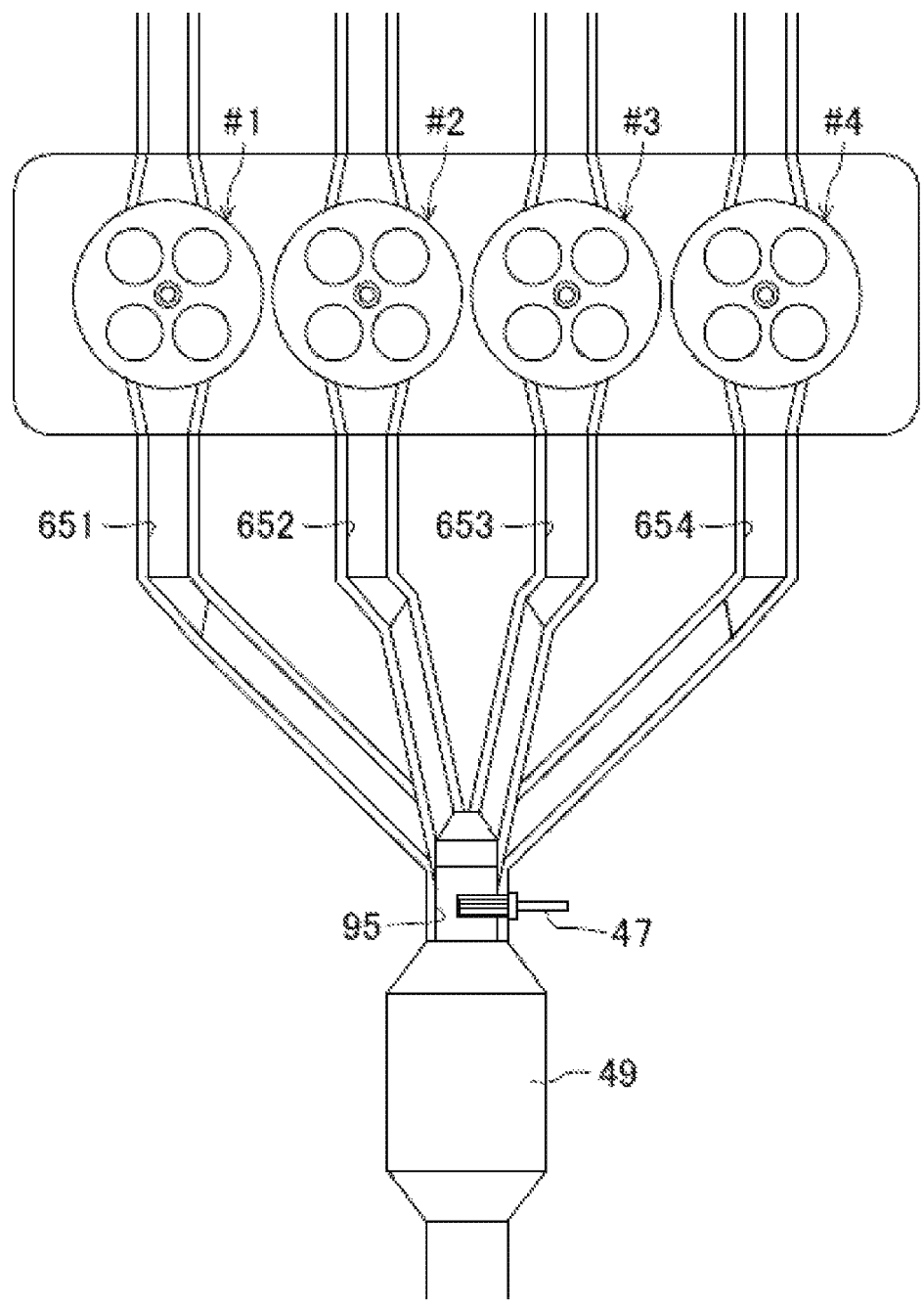
FIG. 2 is a schematic view showing an example of a configuration of an exhaust system in the engine system.

In the intake passage 55, an air cleaner 75, an intake air temperature sensor 43, an airflow sensor 29 for detecting a flow rate of intake air, a throttle valve 41 for blocking the intake passage 55 by being driven with an electric motor 411, a TSCV (Tumble Swirl Control Valve) 31 for adjusting strength of air intake flow inside each combustion chamber 11, are arranged in this order from the upstream side to the downstream side. As shown in FIGS. 1 and 2, a linear $O_2$ sensor 47 for outputting a linear signal with respect to an oxygen concentration in the exhaust gas, and a catalytic converter 49 for purifying the exhaust gas are arranged in an exhaust manifold part 95 at which exhaust passages 651, 652, 653, and 654 from the four cylinders #1, #2, #3, and #4 gather. For the catalytic converter 49, a three-way catalyst which can simultaneously purify three chemical components such as HC, CO, and NOx may be adopted, for example. A sensed value outputted from the linear $O_2$ sensor 47 is taken into the PCM 21 where it is used for detection of an air fuel ratio of air fuel mixture. Based on the sensed value, the PCM 21 performs an air fuel ratio feedback control of the engine 1 (e.g., adjustment of a fuel injection amount by the injector 39 so as to achieve a desired air fuel ratio). In addition, the PCM 21 diagnoses whether a difference of the air fuel ratio between the cylinders (cylinder-to-cylinder imbalance) occurs, as described later.

The PCM 21 may be a typical microcomputer, for example, and as shown in FIG. 1, it includes at least a CPU 211, a ROM 212, a RAM 213, an I/O interface circuit 214, and a data bus. In this example, the PCM 21 receives input, via the I/O interface circuit 214, including output signals from the crank angle sensor 37, the engine water temperature sensor 23, the airflow sensor 29, the linear $O_2$ sensor 47, the intake air temperature sensor 43, and the engine oil temperature sensor 33, as well as output signals from a throttle opening sensor 53 for detecting a throttle opening, and an engine speed sensor 57 for detecting an engine speed. The PCM 21 outputs control signals to the ignition circuits 19, the VVT mechanisms 351 and 451, the injectors 39, the throttle valve 41, and the EGR valve 51 based on the output signals from the sensors to control the engine 1 (including the air fuel ratio feedback control). The PCM 21 also performs the cylinder-to-cylinder imbalance diagnosis of the air fuel ratio based on the sensed values by the linear $O_2$ sensor 47, as described later in detail. An alarm lamp 59, or other diagnostic indicator, is electrically connected with the PCM 21, and the PCM 21 also controls lighting of the alarm lamp 59. The alarm lamp 59 is a lamp which is arranged in an instrument panel and issues an alarm to a person on board, for example. In this example, specifically, the alarm lamp 59 is turned on when the PCM 21 determines that the cylinder-to-cylinder imbalance of the air fuel ratio occurred. Additionally, a diagnostic code may be set by PCM 21 (e.g., a tester), indicating that the cylinder-to-cylinder imbalance of the air fuel ratio occurred, after a test of the system.

Figure 3:
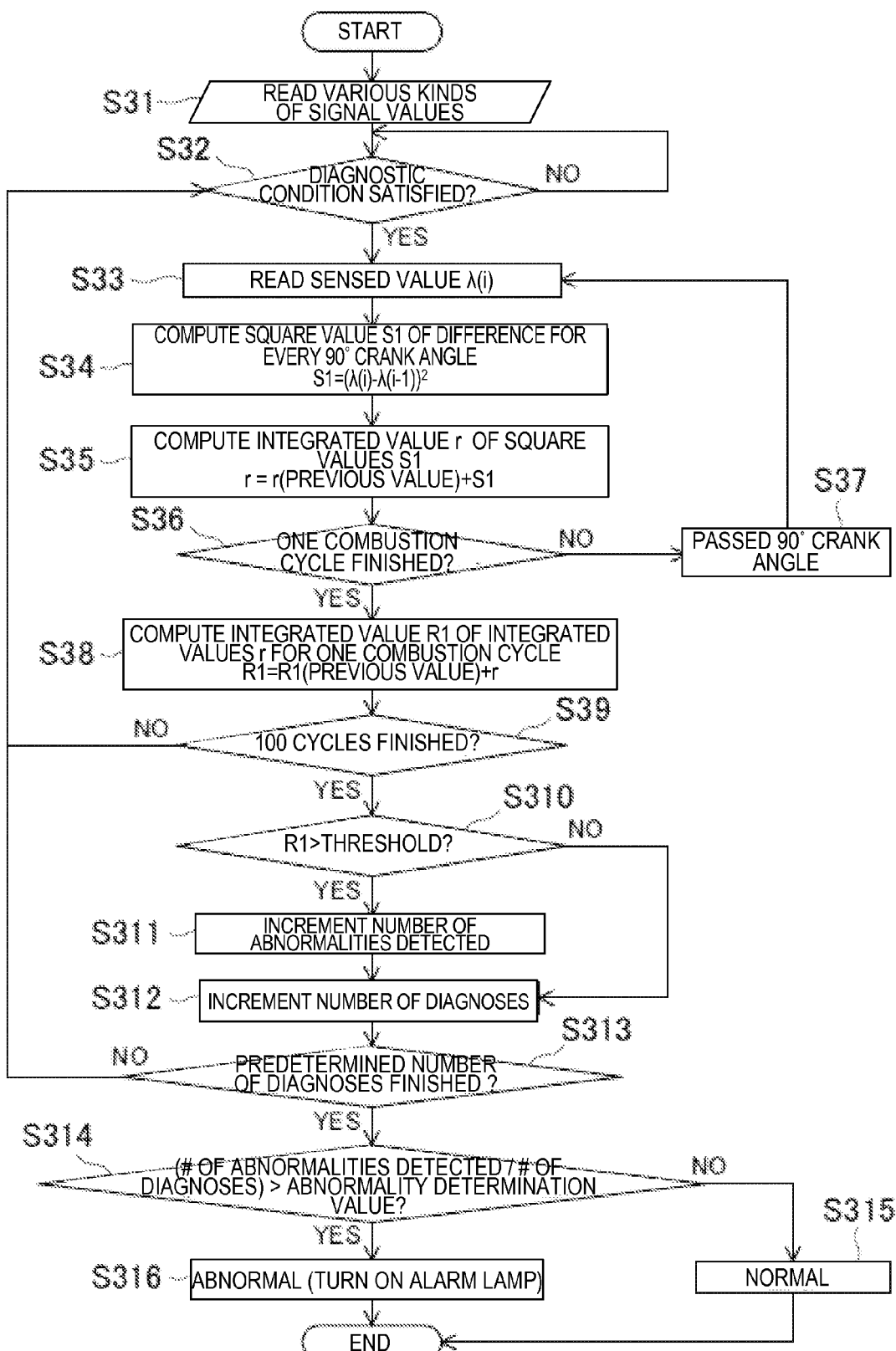
FIG. 3 is an example of a flowchart according to a cylinder-to-cylinder imbalance diagnosis of an air fuel ratio performed by a PCM.

FIG. 3 shows an example of a flowchart according to the cylinder-to-cylinder imbalance diagnosis of the air fuel ratio, performed by the PCM 21. In this flowchart, specifically, a square value of a difference of the sensed values of the linear $O_2$ sensor 47 obtained at 90-degree intervals of crank angles is computed at predetermined cycles, and occurrence of the cylinder-to-cylinder imbalance of the air fuel ratio is diagnosed based on an integrated value of the square values over one combustion cycle. First, at Step S31, the PCM 21 reads out the output signal values of the various kinds of sensors, and then, at Step S32, the PCM 21 determines whether an execution condition of the cylinder-to-cylinder imbalance diagnosis is satisfied based on the read signal values. The PCM 21 determines that the diagnostic condition is satisfied when an engine warm-up operation has been ended (e.g., in a state in which a cooling water temperature is greater than a predetermined temperature, and in a state in which variations in the engine speed, air intake filling efficiency, and throttle opening is small and stable (e.g., they are below predetermined values). However, the diagnostic condition is not limited to these. When determined to be YES at Step S32, the PCM 21 proceeds to Step S33, and on the other hand, when determined to be NO, the PCM 21 repeats Step S32.

At Step S33, the PCM 21 reads the sensed value $\lambda(i)$ of the linear $O_2$ sensor 47, and then, at Step S34, the PCM 21 computes a square value S1 of the difference between a previous value $\lambda(i-1)$ and a current value $\lambda(i)$ of the sensed value (backward difference). That is, $$S1 = (\lambda(i) - \lambda(i-1))^2$$

is computed. As shown by black dots in FIG. 4, because the sensed value of the linear $O_2$ sensor 47 is acquired at every 90-degree crank angle, the square value S1 computed at Step S34 is a square value of the difference of the sensed values for every 90-degree crank angle. In other words, the PCM 21 computes a square value of a rate of change in the sensed value. Note that, if Step S34 is the first time and if the previous value does not exist, Step S34 will be skipped.

Figure 5:
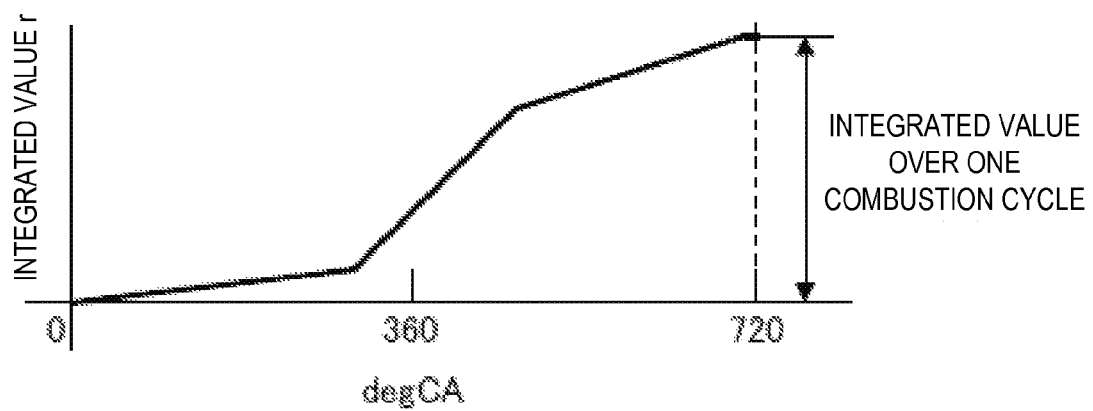
FIG. 5 is a graph showing an example of an integrated value according to a diagnostic parameter.

Then, as shown in FIG. 5, at Steps S35 and S36, the PCM 21 integrates the square values S1 over one combustion cycle of the engine 1 (in other words, for 720-degree crank angle). That is, at Step S35, Integrated value $r = r$(previous value)$+ S1$ is computed, and the PCM 21 then determines at Step S36 whether the integration over one combustion cycle is completed. If YES at Step S36, the PCM 21 proceeds to Step S38, and, on the other hand, if NO, it proceeds to Step S37. The PCM 21 waits for 90-degree crank angle to pass at Step S37, and then returns to Step S33 to reads a new sensed value $\lambda(i)$.

Figure 6:
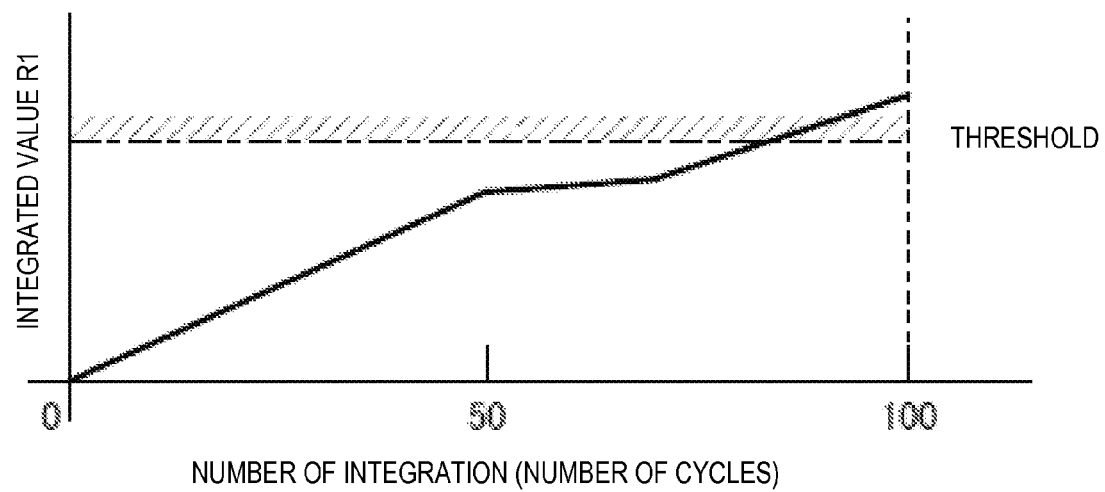
FIG. 6 is a graph showing an example of an integrated value which is obtained by further integrating integrated values over one combustion cycle.

At Steps S38 and S39, the PCM 21 integrates the integrated values r over one combustion cycle for 100 cycles (refer to FIG. 6). That is, at Step S38, the PCM 21 computes Integrated value $R1 = R1$(previous value)$+ r$;

and it then determines at Step S39 whether the integration for 100 cycles is completed. If determined to be NO at Step S39, the PCM 21 returns to Step S32 to determine whether the diagnostic condition is satisfied. The integration over one combustion cycle at Step S35 is performed continuously; however, the integration for 100 cycles at Step S38 is not necessarily performed continuously. That is, after the integration over one combustion cycle is completed at Step S36 and then the predetermined time is lapsed before the diagnostic condition is again satisfied, the next integration over one combustion cycle may be performed. If determined to be YES at Step S39, The PCM 21 proceeds to Step S310 to determine whether the computed integrated value R1 exceeds a threshold value which is set in advance and is stored in the PCM 21. For example, the example of FIG. 6 shows that the integrated value R1 exceeds the threshold value shown by a dashed line. If determined to be YES at Step S310, the PCM 21 proceeds to Step S311 to increment the number of abnormalities detected and then increments the number of diagnoses at Step S312. If determined to be NO at Step S310, the PCM 21 increments only the number of diagnoses at Step S312, without proceeding to Step S311 and therefore without incrementing the number of abnormalities detected.

At Step S313, the PCM 21 determines whether the diagnoses are completed for the predetermined number of times. The number of diagnoses may be 15 times, for example, but is not limited to this number. If determined to be NO at Step S313, the PCM 21 returns to Step S32 to continue the diagnosis, and, on the other hand, if YES, it proceeds to Step S314. At Step S314, the PCM 21 computes a rate of abnormalities detected (number of abnormalities detected/number of diagnoses) among the predetermined number of diagnoses, and then determines whether the rate exceeds an abnormality determination value set in advance. If determined to be NO at Step S314, the PCM 21 proceeds to Step S315 to determine that the engine 1 is normal. On the other hand, if determined to be YES at Step S314, the PCM 21 proceeds to Step S316 to determine that an abnormality occurred in the engine 1, more specifically, the cylinder-to-cylinder imbalance of the air fuel ratio occurred, and the PCM 21 then turns on the alarm lamp 59.

In this diagnosing method of the engine 1, the square value of the difference of the sensed values of the linear $O_2$ sensor 47 is used as a diagnostic parameter. As the difference is larger, that is, as the variation of the sensed value is larger, the square value exaggerates this change. As shown by a dashed line in FIG. 7, a relationship between the amount of the cylinder-to-cylinder imbalance of the air fuel ratio and the integrated value of the differences has a relationship in which the integrated value increases linearly as the amount of imbalance becomes larger even when the cylinder-to-cylinder imbalance shifts either to rich or lean. This is because that, when an air fuel ratio of a specific cylinder shifts, the air fuel ratios of all the cylinders are corrected so that the shift is cancelled since the air fuel ratio feedback control is performed. As for the diagnostic parameter for diagnosing the cylinder-to-cylinder imbalance of the air fuel ratio, if the integrated value of the differences is used, the integrated value of the differences is compared with the determination value set in advance (refer to the dashed dotted line of FIG. 7). Then, the PCM 21 determines that a nonpermissible cylinder-to-cylinder imbalance occurred when the integrated value of the differences exceeds the determination value. However, as illustrated by example in FIG. 7, because the variation in the sensed value of the linear $O_2$ sensor 47 is relatively small when the amount of the cylinder-to-cylinder imbalance of the air fuel ratio is relatively small, the variation in the integrated value will be small. On the other hand, because the variation in the sensed value of the linear $O_2$ sensor 47 will be larger as the cylinder-to-cylinder imbalance of the air fuel ratio becomes larger, the variation in the integrated value will also be larger. The increase of the variation in the integrated value will result in the computed integrated value being smaller than the actual value so that it will be smaller than the determination value. As a result, in practice, the PCM 21 determines that the engine 1 is normal although the PCM 21 should rather determine that the engine 1 is abnormal, or because the integrated value becomes larger than the actual value so that it will be larger than the determination value, the PCM 21 determines that the engine 1 is abnormal although the PCM 21 should rather determine that the engine 1 is normal. This reduces an accuracy of the diagnosis.

Figure 7:
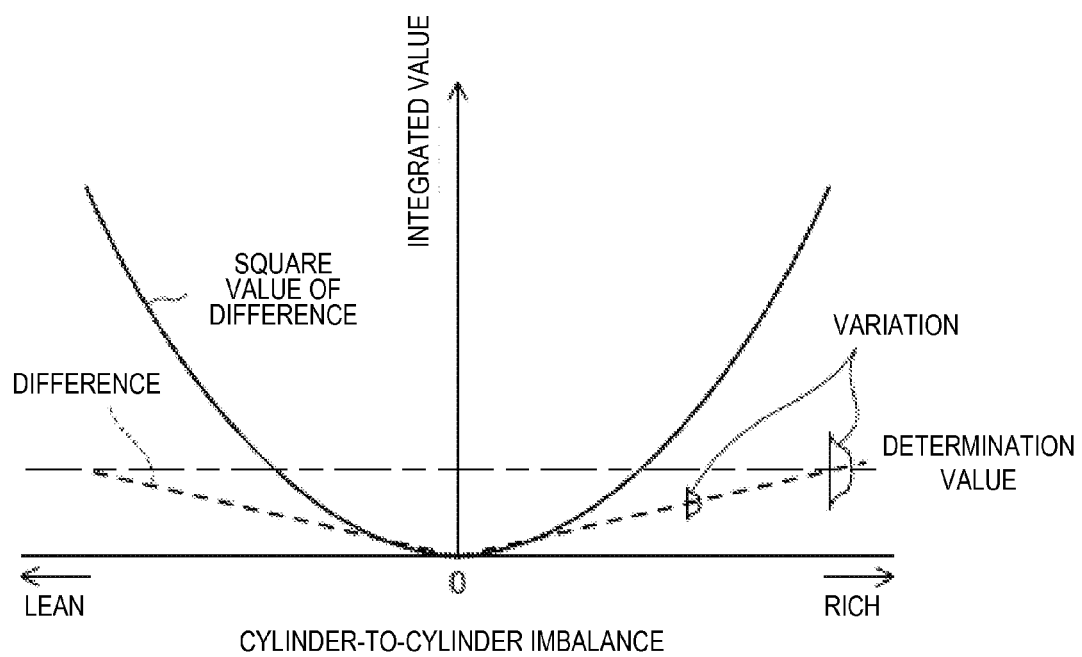
FIG. 7 is a graph showing, in a relationship between an amount of cylinder-to-cylinder imbalance of an air fuel ratio and an integrated value, a difference between a characteristic of the integrated value of the cylinder-to-cylinder imbalance and a characteristic of the integrated value of squared cylinder-to-cylinder imbalance values.

On the other hand, as shown by a solid line in FIG. 7, the square value of the difference of the sensed values has a characteristic which greatly differs from the dashed line. That is, as the differences become larger, the integrated value will also be larger so that it exaggerates the differences. Therefore, even if the variation in the sensed value becomes larger and thus the variation in the integrated value becomes also larger, it is possible to make this influence relatively smaller to prevent the erroneous diagnoses.

Figure 4:
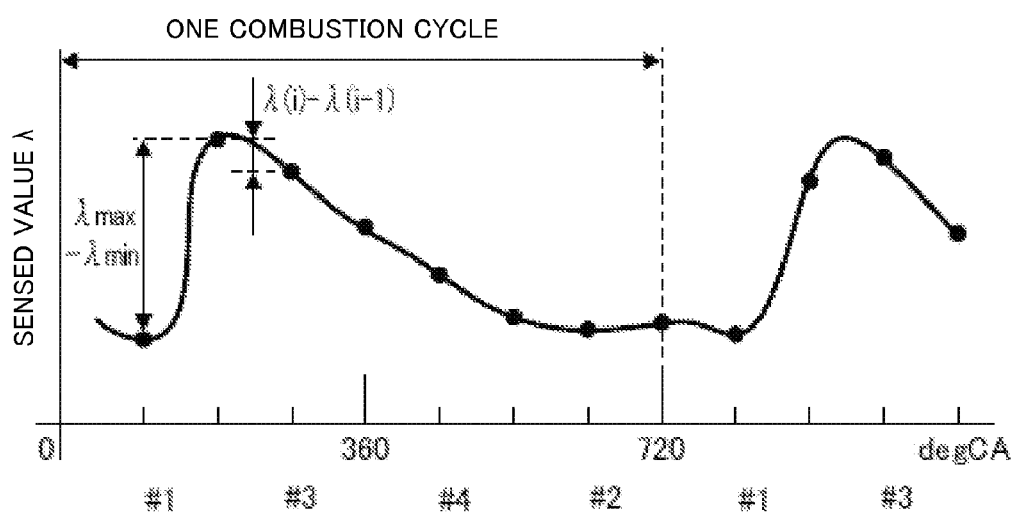
FIG. 4 is a graph showing an example of a sensor output value.

In the above-described diagnosing method, the square values of the differences are integrated over one combustion cycle, and this is an advantageous configuration when reflecting the varying state of the sensed value of the linear $O_2$ sensor 47 to the diagnostic parameter. As shown in FIG. 4, the varying pattern of the sensed value of the linear $O_2$ sensor 47 will be one cycle per one combustion cycle. Therefore, integrating the squared values of the differences over one combustion cycle may include a varying pattern during the period of integration. That is, this makes the state of the cylinder-to-cylinder imbalance of the air fuel ratio reflect the diagnostic parameter correctly and, thus, it can be advantageous to improve the diagnosis accuracy. Note that the period of integration is not limited to one combustion cycle, but may be set to an integral multiple of one combustion cycle, which is larger than 1.

Further, in the above-described diagnosing method, the integrated value r over one combustion cycle is integrated over another 100 cycles. This integration is equivalent to averaging the integrated values r, and this is advantageous when reducing the influence in which the integrated value r varies due to the variation in the output signal from the linear $O_2$ sensor 47 to improve the diagnosis accuracy. However, the number of the integration of the integrated values r is not limited to 100 cycles, and may be set to any arbitrary number. Of course, it may be 1 cycle.

In addition, in the above-described diagnosing method, abnormalities are detected by the comparison of the integrated value R1 for 100 cycles with the threshold value, and finally, occurrence of abnormalities is determined based on whether the rate of abnormalities detected during the predetermined number of diagnoses exceeds the predetermined abnormality determination value. Therefore, high diagnosis accuracy can be secured.

Note that Steps S311 to S314 may be skipped, and if determined to be YES at Step S310, the PCM 21 may proceed to Step S316 to determine that the engine 1 is abnormal, or, on the other hand, if determined to be NO at Step S310, the PCM 21 may proceed to Step S315 to determine that the engine 1 is normal.

Figure 8:
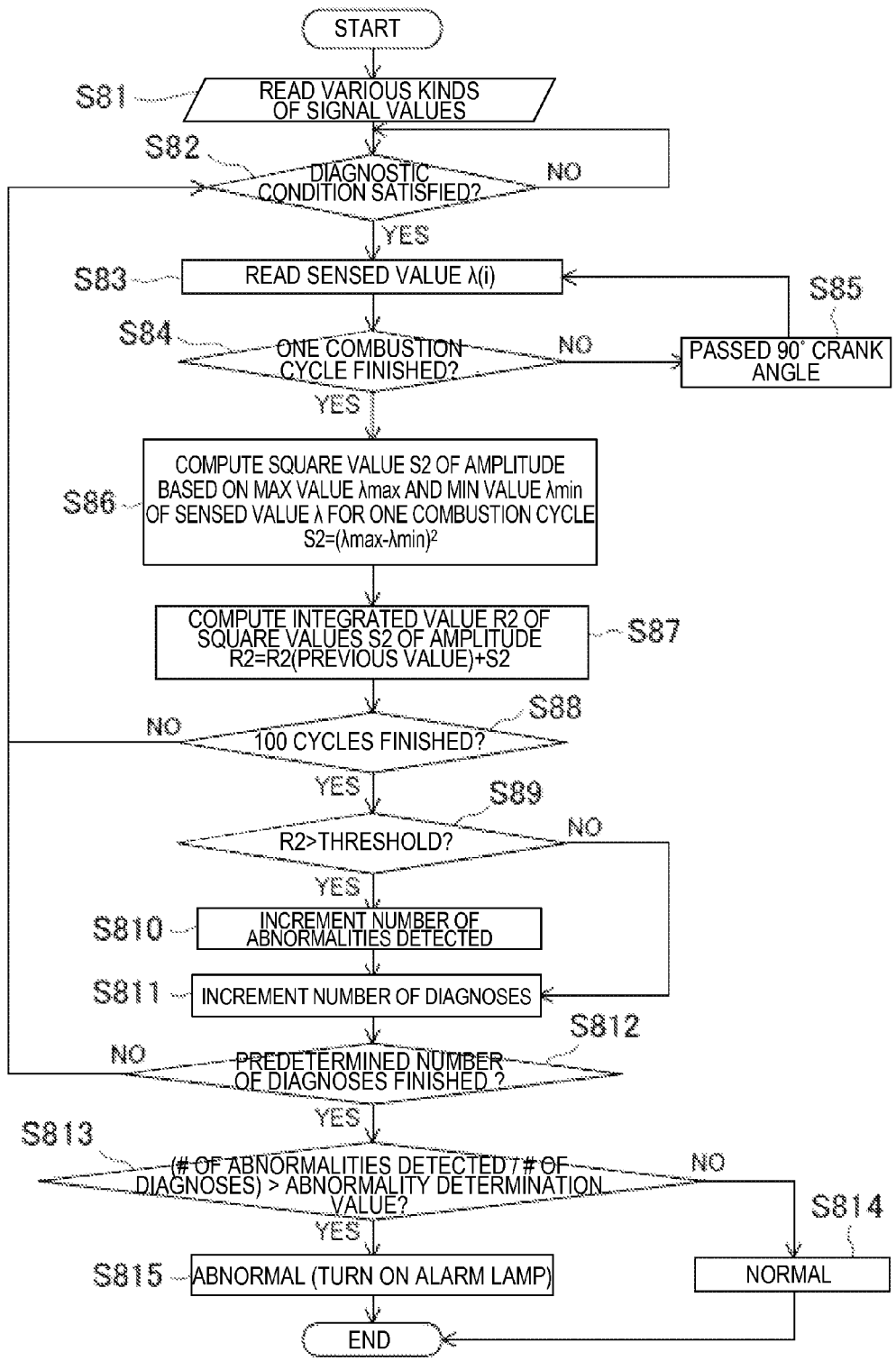
FIG. 8 is an example of a flowchart according to the cylinder-to-cylinder imbalance diagnosis of the air fuel ratio performed by the PCM.

FIG. 8 shows a flowchart according to the diagnosing method of the engine 1 using another diagnostic parameter. In this flowchart, as shown in FIG. 4, for example, a square value of a difference of the maximum sensed value λmax and the minimum sensed value λmin is computed among the sensed values of the linear $O_2$ sensor 47 over one combustion cycle, and the cylinder-to-cylinder imbalance of the air fuel ratio is diagnosed based on the square value. This is a diagnostic technique focused on that the varying pattern of the sensed value of the linear $O_2$ sensor 47 associated with the cylinder-to-cylinder imbalance of the air fuel ratio occurs by one cycle per one combustion cycle, as described above. That is, the difference of the maximum λmax and the minimum λmin of the sensed value, in other words, a variation amplitude of the sensed value over one combustion cycle, corresponds to the state where the cylinder-to-cylinder imbalance of the air fuel ratio occurs, and represents that the cylinder-to-cylinder imbalance will be larger as the difference of the sensed values is larger.

In another example, a difference of the maximum sensed value λmax and the minimum sensed value λmin may be computed among the sensed values of the linear $O_2$ sensor 47 over a single engine cycle, where a single engine cycle includes a combustion (e.g., one combustion, and only one combustion) of each cylinder of the multi-cylinder engine. Therefore, a diagnostic method similar to FIG. 8 could be carried out, as described by FIG. 8, except incidences of "a combustion cycle" made herein with respect to the steps and processes of FIG. 8 can be replaced with "a single engine cycle".

At Step S81 of the flowchart in FIG. 8, the PCM 21 reads various kinds of sensor output signal values, and at Step S82, the PCM 21 determines whether an execution condition of the cylinder-to-cylinder imbalance diagnosis is satisfied based on the read signal values. The execution condition may be the same condition as the above. If determined to be YES at Step S82, the PCM 21 proceeds to Step S83, and if determined to be NO at Step S82, the PCM 21 repeats this step.

At Step S83, the PCM 21 reads a sensed value kW of the linear $O_2$ sensor 47, and then, at Step S84, the PCM 21 determines whether the sensed values over one combustion cycle are read. If determined to be YES at Step S84, the PCM 21 proceeds to Step S86, and if determined to be NO, it proceeds to Step S85. The PCM 21 waits for 90-degree crank angle to pass at Step S85, and then returns to Step S83 to read a new sensed value λ(i).

At Step S86, the PCM 21 determines the maximum λmax and the minimum λmin among the read sensed values over one combustion cycle, and then computes a square value S2 of the difference, that is, the amplitude of the sensed value waveform shown in FIG. 4, for example. That is, $$S2=(\lambda max - \lambda min)^2$$

is computed. In another example, S2 may be calculated as the square of a difference between an air fuel ratio sensor output at a beginning of a predetermined period (e.g., a combustion cycle) and an air fuel ratio sensor output at an end of the predetermined period.

Then, at Steps S87 and S88, the PCM 21 integrates the square values S2 for 100 cycle. That is, at Step S87, Integrated value $R2=R2$(previous value)$+S2$ is computed, and the PCM 21 then determines at Step S88 whether the integration for 100 cycles is completed. If determined to be NO at Step S88, the PCM 21 returns to Step S82 to determine whether the diagnostic condition is satisfied. This is similar to that of the flowchart in FIG. 3. On the other hand, if determined to be YES at Step S88, the PCM 21 proceeds to Step S89 to determine whether the computed integrated value R2 exceeds the threshold value set and stored in the PCM 21 in advance. If determined to be YES at Step S89, the PCM 21 proceeds to Step S810 to increment the number of abnormalities detected, and then at Step S811, the PCM 21 increments the number of diagnoses. On the other hand, if determined to be NO at Step S89, the PCM 21 increments only the number of diagnoses at Step S811 without proceeding to Step S810.

At Step S812, the PCM 21 determines whether the diagnoses are completed for a predetermined number of times set in advance. The number of diagnoses may be 15 times, for example, but is not limited to this number. If determined to be NO at Step S812, the PCM 21 returns to Step S82 to continue the diagnosis, and if determined to be YES, it proceeds to Step S813. At Step S813, the PCM 21 computes a rate of abnormalities detected (number of abnormalities detected/number of diagnoses) during the diagnoses of the predetermined number of times, and then determines whether it exceeds a predetermined abnormality determination value. If determined to be NO at Step S813, the PCM 21 proceeds to Step S814 to determine that the engine 1 is normal. On the other hand, if determined to be YES at Step S813, the PCM 21 proceeds to Step S815 to determine that the abnormalities of the engine 1 occur, and then, the PCM 21 turns on the alarm lamp 59.

In this flowchart, the square value of the amplitude of the varying waveform of the sensed value of the linear $O_2$ sensor 47 is computed. As described above, because the amplitude of the varying waveform corresponds to the amount of cylinder-to-cylinder imbalance of the air fuel ratio, the square value will have a characteristic in which it exaggerates the amount of difference as the amount becomes larger. Therefore, even if the variation in the sensed value becomes larger and the variation in the square value thus becomes larger, it is possible to make the influence relatively small to prevent erroneous diagnoses.

Note that, in the above-described flowchart, the difference of the maximum sensed value and the minimum sensed value of the linear $O_2$ sensor 47 over one combustion cycle of the engine 1 is computed. For example, the difference of the maximum sensed value and the minimum sensed value during the period of an integral multiple of combustion cycle larger than 1 may be computed. However, because the sensed value of the linear $O_2$ sensor 47 may include a variation for a longer cycle than one combustion cycle, the maximum sensed value and the minimum sensed value during the period longer than one combustion cycle may include a variation component of that longer cycle. It may be preferred to compute the difference of the maximum sensed value and the minimum sensed value of the linear $O_2$ sensor 47 over one combustion cycle of the engine 1 from a viewpoint of improvement in the diagnosis accuracy. As yet another example, a square of a difference between an air fuel ratio sensor output at the beginning of the longer cycle and an air fuel ratio sensor output at an end of the longer cycle may be computed, in order to improve diagnosis accuracy.

Further, in the flowchart of FIG. 8, even if the integrations are not performed for 100 cycles, the number of integrations may be set to any arbitrary number of cycles (including 1 cycle). Further, Steps S810 to S813 may be omitted.

It should be appreciated by those skilled in the art that the processing of each step shown in the flowcharts of FIGS. 3 and 8 and the executing order of the steps are merely illustration and, thus, contents of the processing may be altered, or the order of the processing may be changed, or a part of the processing may be omitted. It is also possible to execute a plurality of processing in parallel, if needed.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of diagnosing an internal combustion engine system having a multi-cylinder internal combustion engine and an air fuel ratio sensor which detects an air fuel ratio of mixed exhaust gas flowing from the multiple cylinders and outputs a signal corresponding to said detected air fuel ratio, the method comprising:
for each of a plurality of diagnostic control loops:
for each of a predetermined number of sub-cycles of a combustion cycle of the engine:
at a powertrain control module, receiving air fuel ratio data as input data from the air fuel ratio sensor;
computing a square value of a difference between a beginning output value and an end output value of the input data, said air fuel ratio sensor outputting the beginning output value and the end output value at discrete timings within each sub-cycle;
integrating said square value during each sub-cycle; and
after the predetermined number of sub-cycles;
diagnosing said internal combustion engine system based on said integrated square value to determine whether a computed integrated value R1 exceeds a threshold value which is set in advance;
if the R1 value exceeds the threshold value, determining that an abnormality exists in the diagnosis for the diagnostic control loop;
computing a rate of abnormalities detected among the plurality of diagnostic control loops, and
after the plurality of diagnostic control loops:
determining whether the rate exceeds an abnormality determination value set in advance; and
if the rate exceeds the abnormality determination value, then outputting an alarm to a diagnostic indicator.

2. The method as described in claim 1, wherein said air fuel ratio sensor outputs said beginning output value and end output value at a beginning and an end of said sub-cycle.

3. The method as described in claim 2, wherein computing a rate of abnormalities includes:
counting a number of times at which said integrated value exceeds said predetermined value; and
determining abnormality of said internal combustion engine system when said counted number exceeds a predetermined number in a predetermined number of comparison cycles.

4. The method as described in claim 1, wherein said beginning output value and end output value output within said sub-cycle are a maximum value and a minimum value over a cylinder cycle of said internal combustion engine.

5. The method as described in claim 4, wherein computing a rate of abnormalities includes:
counting a number of times at which said integrated value exceeds said predetermined value; and
determining abnormality of said internal combustion engine system when said counted number exceeds a predetermined number in a predetermined number of comparison cycles.

6. The method as described in claim 1, wherein computing a rate of abnormalities includes:
counting a number of times at which said integrated value exceeds said predetermined value; and
determining abnormality of said internal combustion engine system when said counted number exceeds a predetermined number in a predetermined number of comparison cycles.

7. A method of diagnosing an internal combustion engine system having a multi-cylinder internal combustion engine and an air fuel ratio sensor which detects an air fuel ratio of mixed exhaust gas flowing from the multiple cylinders and outputs a signal corresponding to said detected air fuel ratio, the method comprising:
for each of a plurality of diagnostic control loops:
for each of a predetermined number of sub-cycles of a combustion cycle of the engine:
at a powertrain control module, receiving air fuel ratio data as input data from the air fuel ratio sensor;
computing a square value of a difference between a maximum output value and a minimum output value of the input data, said fuel ratio sensor outputting the minimum output value and the maximum output value at discrete timings within each sub-cycle; and diagnosing said internal combustion engine system based on said square value to determine whether a computed value R1 exceeds a threshold value which is set in advance;

if the R1 value exceeds the threshold value, determining that an abnormality exists in the diagnosis for the diagnostic control loop;

computing a rate of abnormalities detected among the plurality of diagnostic control loops, and after the plurality of diagnostic control loops:
determining whether the rate exceeds an abnormality determination value set in advance; and
if the rate exceeds the abnormality determination value, then outputting an alarm to a diagnostic indicator.

8. The method as described in claim 7, further comprising:
integrating said square value over predetermined times to form an integrated square value, and
wherein said diagnosing of said internal combustion engine system is made based on said integrated square value.

9. The method as described in claim 8, further comprising:
comparing said integrated square value with a predetermined threshold value; and
determining abnormality of said internal combustion engine system when said integrated square value exceeds said predetermined threshold value.

10. The method as described in claim 8, wherein computing a rate of abnormalities includes:
counting a number of times at which said integrated value exceeds said predetermined value; and
determining abnormality of said internal combustion engine system when said counted number exceeds a predetermined number in a predetermined number of comparison cycles.

11. The method as described in claim 7, wherein computing a rate of abnormalities includes:
counting a number of times at which said integrated value exceeds said predetermined value; and
determining abnormality of said internal combustion engine system when said counted number exceeds a predetermined number in a predetermined number of comparison cycles.

12. A system for diagnosing an internal combustion engine system having a multi-cylinder internal combustion engine and an air fuel ratio sensor which detects an air fuel ratio of mixed exhaust gas flowing from the multiple cylinders, and outputs a signal corresponding to said detected air fuel ratio, comprising:
a tester configured to:
for each of a plurality of diagnostic control loops:
for each of a predetermined number of sub-cycles of a combustion cycle of the engine:
at a powertrain control module, receiving air fuel ratio data as input data from the air fuel ratio sensor;
computing a square value of a difference between a beginning output value and an end output value of the input data, said air fuel ratio sensor outputting the beginning output value and the end output value at discrete timings within each sub-cycle;
integrating said square value during each sub-cycle; and
after the predetermined number of sub-cycles:
diagnosing said internal combustion engine system based on said integrated square value to determine whether a computed integrated value R1 exceeds a threshold value which is set in advance;
if the R1 value exceeds the threshold value, determining that an abnormality exists in the diagnosis for the diagnostic control loop;
computing a rate of abnormalities detected among the plurality of diagnostic control loops; and
after the plurality of diagnostic control loops:
determining whether the rate exceeds an abnormality determination value set in advance; and
if the rate exceeds the abnormality determination value, then outputting an alarm to a diagnostic indicator.

13. The system as described in claim 12, wherein said tester is integrated with a controller of said internal combustion engine system.

14. The method as described in claim 1, wherein said beginning output value and end output value output within said sub-cycle are a maximum value and a minimum value of a single engine cycle, the single engine cycle including a combustion of each cylinder of the multi-cylinder engine.

* * * * *